(12) United States Patent
Vollert et al.

(10) Patent No.: US 11,572,048 B2
(45) Date of Patent: Feb. 7, 2023

(54) CONTROL DEVICE AND METHOD FOR OPERATING AN ELECTROMECHANICAL BRAKE BOOSTER OF A BRAKE SYSTEM OF A VEHICLE

(71) Applicant: Robert Bosch GmbH, Stuttgart (DE)

(72) Inventors: Herbert Vollert, Vaihinge/Enz (DE);
Dirk Mahnkopf, Eglosheim (DE);
Christian Binder, Mainhardt (DE);
Manfred Gerdes, Vaihingen/Enz (DE);
Oliver Fuchs, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 844 days.

(21) Appl. No.: 16/470,271

(22) PCT Filed: Nov. 30, 2017

(86) PCT No.: PCT/EP2017/080987
§ 371 (c)(1),
(2) Date: Jun. 17, 2019

(87) PCT Pub. No.: WO2018/121954
PCT Pub. Date: Jul. 5, 2018

(65) Prior Publication Data
US 2020/0086844 A1     Mar. 19, 2020

(30) Foreign Application Priority Data

Dec. 29, 2016  (DE) .................... 10 2016 226 321.8

(51) Int. Cl.
*B60T 13/74*     (2006.01)
*H02P 6/06*      (2006.01)
(Continued)

(52) U.S. Cl.
CPC ............ *B60T 13/745* (2013.01); *B60K 31/08* (2013.01); *B60T 8/17* (2013.01); *B60T 13/143* (2013.01);
(Continued)

(58) Field of Classification Search
CPC .......... B60T 8/17; B60T 8/171; B60T 13/662; B60T 13/74; B60T 13/741; B60T 13/745;
(Continued)

(56) References Cited

U.S. PATENT DOCUMENTS 8,899,696 B2 * 12/2014 Weiberle ............... B60T 13/745
303/114.1
9,573,575 B2 * 2/2017 Gerdes .................. B60T 13/745
(Continued)

FOREIGN PATENT DOCUMENTS

| CN | 104760580 A | 7/2015 |
|---|---|---|
| DE | 100 05 869 A | 3/2001 |

(Continued)

OTHER PUBLICATIONS

International Search Report corresponding to PCT Application No. PCT/EP2017/080987, dated May 17, 2018 (German and English language document) (5 pages).

*Primary Examiner* — Bradley T King
*Assistant Examiner* — Stephen M Bowes
(74) *Attorney, Agent, or Firm* — Maginot, Moore & Beck LLP

(57) ABSTRACT

The disclosure relates to a control device and a corresponding method for operating an electromechanical brake booster of a brake system of a vehicle, comprising an electronics unit that defines a target variable with respect to a target rotational speed of a motor of the electromechanical brake booster, taking into account a brake input signal with respect to a braking request, and that sends at least one control signal (Continued)

to the motor. The electronics unit defines a maximum target variable with respect to a maximum target rotational speed of the motor, taking into account a current intensity of a motor current of the motor and a current angle of rotation of a rotor of the motor, and defines the target variable with respect to the target rotational speed of the motor of the electromechanical brake booster to be at the most equal to the defined maximum target variable.

15 Claims, 2 Drawing Sheets

(51) Int. Cl.
*H02P 23/18* (2016.01)
*B60K 31/08* (2006.01)
*B60T 8/17* (2006.01)
*B60T 13/14* (2006.01)
*B60T 13/62* (2006.01)
*B60T 13/66* (2006.01)
*H02P 23/14* (2006.01)

(52) U.S. Cl.
CPC ............ *B60T 13/62* (2013.01); *B60T 13/662* (2013.01); *H02P 23/14* (2013.01); *H02P 23/183* (2016.02); *B60T 2201/02* (2013.01)

(58) Field of Classification Search
CPC ...... B60T 13/746; B60T 17/18; B60T 17/221; B60T 2270/84; F16D 2066/003; F16D 2066/005; F16D 2121/24; H02P 6/06
See application file for complete search history.

(56) References Cited

U.S. PATENT DOCUMENTS

| | | | |
|---|---|---|---|
| 2008/0179941 A1 | 7/2008 | Matsushita | |
| 2012/0151914 A1* | 6/2012 | Nishioka | B60T 13/745 60/545 |
| 2013/0080017 A1 | 3/2013 | Bohm | |
| 2015/0046053 A1* | 2/2015 | Gerdes | B60T 13/745 701/70 |
| 2016/0134223 A1* | 5/2016 | Amagasa | B60S 1/08 318/432 |
| 2016/0178020 A1* | 6/2016 | Masuda | F16D 55/225 188/162 |
| 2016/0200299 A1 | 7/2016 | Böhm et al. | |
| 2016/0200306 A1* | 7/2016 | Butz | B60T 13/745 60/545 |
| 2017/0267218 A1* | 9/2017 | Bunk | B60T 13/746 |

FOREIGN PATENT DOCUMENTS

| | | | |
|---|---|---|---|
| DE | 20 2010 017 605 U1 | 11/2012 | |
| DE | 10 2012 203 698 A1 | 9/2013 | |
| DE | 10 2014 210 550 A1 | 12/2015 | |
| DE | 10 2014 213 913 A1 | 1/2016 | |
| JP | 4165093 B2 * | 10/2008 | |
| JP | 2012-131263 A | 7/2012 | |
| JP | 2013-519553 A | 5/2013 | |
| JP | 2015-512822 A | 4/2015 | |
| JP | 2016-529162 A | 9/2016 | |
| WO | 2015/185241 A1 | 12/2015 | |

* cited by examiner

CONTROL DEVICE AND METHOD FOR OPERATING AN ELECTROMECHANICAL BRAKE BOOSTER OF A BRAKE SYSTEM OF A VEHICLE

This application is a 35 U.S.C. § 371 National Stage Application of PCT/EP2017/080987, filed on Nov. 30, 2017, which claims the benefit of priority to Serial No. DE 10 2016 226 321.8, filed on Dec. 29, 2016 in Germany, the disclosures of which are incorporated herein by reference in their entirety.

The disclosure relates to a control device for at least one electromechanical brake booster of a brake system of a vehicle. The disclosure likewise relates to an electromechanical brake booster for a brake system of a vehicle and to a brake system for a vehicle. Furthermore, the disclosure relates to a method for operating an electromechanical brake booster of a brake system of a vehicle.

BACKGROUND

Electromechanical brake boosters, such as by way of example an electromechanical brake booster that is disclosed in DE 20 2010 017 605 U1, are known from the prior art and said brake boosters respectively are upstream/may be upstream of a master brake cylinder of a brake system of a vehicle. By means of an operation of a motor of the respective electromechanical brake booster, at least one adjustable piston of the master brake cylinder is possibly to be moved into the master brake cylinder in such a manner that a master brake cylinder pressure is increased in the master brake cylinder.

SUMMARY

The disclosure provides a control device for at least one electromechanical brake booster of a brake system of a vehicle, an electromechanical brake booster for a brake system of a vehicle, a brake system for a vehicle and a method for operating an electromechanical brake booster of a brake system of a vehicle.

The present disclosure provides advantageous possibilities for using an electromechanical brake booster so as to increase a pressure in a master brake cylinder, which is arranged downstream of the electromechanical brake booster, and at least one wheel brake cylinder that is attached to the master brake cylinder, wherein the electromechanical brake booster may be simultaneously utilized as a "sensor system" for determining a load change that counteracts the electromechanical brake booster. If a load change is identified by means of the present disclosure, it is moreover possible by means of the operation in accordance with the disclosure of the electromechanical brake booster to prevent an excessively high rotational speed of a motor of the electromechanical brake booster from leading to an undesirably high pressure or pressure spikes in the master brake cylinder. Accordingly, use of the present disclosure in a brake system ensures that undesired pressure or pressure spikes do not occur in a brake system component that is attached to the respective master brake cylinder. The present disclosure consequently contributes to reducing a risk of damaging the brake system components of the respective brake system that is used. The present disclosure also contributes to avoiding mechanical loads on the electromechanical brake booster, as a result of which a serviceable life of the electromechanical brake booster is increased.

By way of example, by means of using the electromechanical brake booster as a "sensor system" in accordance with the disclosure it is possible to rapidly identify a situation in which a hydraulic rigidity of the respective brake system increases as occurs by way of example when wheel inlet valves of the respective brake system are closed during an anti-lock braking control procedure. While a procedure of transmitting a signal to a conventional controller electronic system of the electromechanical brake booster in relation to closing the wheel inlet valves in general requires at least 30 ms (milliseconds), it is possible by means of the present disclosure for the load change to be identified much more rapidly and accordingly it is possible to react more promptly by means of limiting the operation of the electromechanical brake booster according to the specified highest desired value. It is possible by means of the procedure of limiting a rotating energy of the motor of the electromechanical brake booster, said limitation procedure being capable of being initiated in this manner, to tailor the operation of said brake booster to the load change in such a manner that fears of undesirably high pressure or pressure spikes in the master brake cylinder or further parts of the respective brake system are unfounded.

In particular, during an anti-lock braking control procedure (ABS control procedure, or ESP control procedure) a comparatively large amount of brake fluid will develop in the master brake cylinder by means of at least one pump/return pump of the brake system. Moreover, wheel inlet valves of the respective brake system are closed. However, it is possible by means of the present disclosure to react rapidly to a possible prevailing risk of an undesirably high pressure in the master brake cylinder by means of using the electromechanical brake booster as a "sensor system". The present disclosure consequently also contributes to reducing a risk of damage during the anti-lock braking control procedure. Consequently, the conventional disadvantage of the electromechanical brake booster that in general said brake booster does not react in an elastic manner and comprises a large holding capacity owing to its high transmission ratio and its high transmission friction may be rectified. The fear of damage to the brake system is therefore unfounded even after performing multiple anti-lock braking control procedures. The procedure of fitting the brake system with the control device described below is consequently easily funded by means of the repair costs that are saved.

In one advantageous embodiment of the control device, the electronic device is designed for the purpose of estimating an estimated value for a braking force into the master brake cylinder of the electromechanical brake booster that is upstream of a master brake cylinder of the brake system taking into account at least the prevailing current strength of the motor current of the motor and the prevailing rotation angle of the rotor of the motor, and for the purpose of specifying the highest desired value taking into account the estimated value for the braking force. As described below in further detail, the estimated value for the braking force of the electromechanical brake booster into the master brake cylinder is a reliable "sensor value" in order to estimate a prevailing risk in relation to a possible excess braking procedure or a brake system overload owing to too great a magnitude of rotating energy of the electromechanical brake booster. It is possible by means of specifying the highest desired value taking into account the estimated value for the braking force to consequently reliably ensure that the electromechanical brake booster is used in a manner that preserves the brake system and simultaneously to rule out braking procedures that are insufficiently intense owing to the electromechanical brake booster not being used to a sufficient degree.

It is preferred that the electronic device is designed for the purpose of estimating a load torque, which the brake system sets against the motor of the electromechanical brake booster, taking into account at least the prevailing current strength of the motor current of the motor and the prevailing rotation angle of the rotor of the motor, and for the purpose of specifying the highest desired value and/or the estimated value for the braking force taking into account the estimated load torque. The load torque may be reliably specified by means of using the electromechanical brake booster as a "sensor system" since the motor of the electromechanical brake booster "senses" which (static) load the brake system sets against the motor of the electromechanical brake booster.

The electronic device may be designed by way of example for the purpose of specifying a motor torque of the motor of the electromechanical brake booster taking into account at least the prevailing current strength of the motor current of the motor, for the purpose of specifying an angular acceleration of the rotor of the motor of the electromechanical brake booster taking into account at least the prevailing rotation angle of the rotor of the motor, for the purpose of specifying a product of the angular acceleration of the rotor of the motor of the electromechanical brake booster and an inertia of the motor, and for the purpose of specifying the load torque taking into account at least a difference between the motor torque of the motor and the product of the angular acceleration and the inertia. The procedures that are performed in order to estimate the load torque consequently render it possible to embody the electronic device in a relatively cost-effective manner and in a manner that proportionally saves installation space.

In a further advantageous embodiment of the control device, the electronic device is designed for the purpose of estimating a load change of a load, which the brake system sets against the motor of the electromechanical brake booster, taking into account at least the prevailing current strength of the motor current of the motor and the prevailing rotation angle of the rotor of the motor, and for the purpose of specifying the highest desired value and/or the estimated value for the braking force taking into account the estimated load change. The electromechanical brake booster may also be advantageously used in this embodiment of the present disclosure as a "sensor system" for estimating the load change.

In particular, the electronic device may be designed for the purpose of specifying an adjustment travel of a piston of the electromechanical brake booster taking into account at least the prevailing rotation angle of the rotor of the motor, for the purpose of specifying a motor force that is exerted by means of the motor of the electromechanical brake booster taking into account the load torque, for the purpose of specifying a time derivative or a gradient of the motor force that is exerted by means of the motor of the electromechanical brake booster, and for the purpose of specifying the load change as a quotient of the time derivative or the gradient of the motor force divided by the adjustment travel of the piston of the electromechanical brake booster. It is therefore also possible to estimate the load change by means of a control device that is comparatively cost-effective and requires relatively little installation space.

The advantages described above are also brought about by means of an electromechanical brake booster for a brake system of a vehicle having a control device of this type. A corresponding electromechanical brake booster may be further developed in accordance with the above-described embodiments of the control device to suit the vehicle concerned.

A brake system for a vehicle having a corresponding control device and the electromechanical brake booster also realizes the above-described advantages. A brake system of this type may also be further developed in accordance with the above-described embodiments of the control device to suit the vehicle concerned. The electromechanical brake booster may be in particular upstream of a master brake cylinder of the brake system.

Furthermore, an implementation of a corresponding method for operating an electromechanical brake booster of a brake system of a vehicle also provides the advantages already described above. Reference is made to the fact that the method for operating an electromechanical brake booster of a brake system of a vehicle may be further developed in accordance with the above-described embodiments of the control device and/or the brake system that is fitted with said control device.

BRIEF DESCRIPTION OF THE DRAWINGS

Further features and advantages of the present disclosure are explained below with the aid of the figures. In the drawings.

DETAILED DESCRIPTION

Figure 1A:
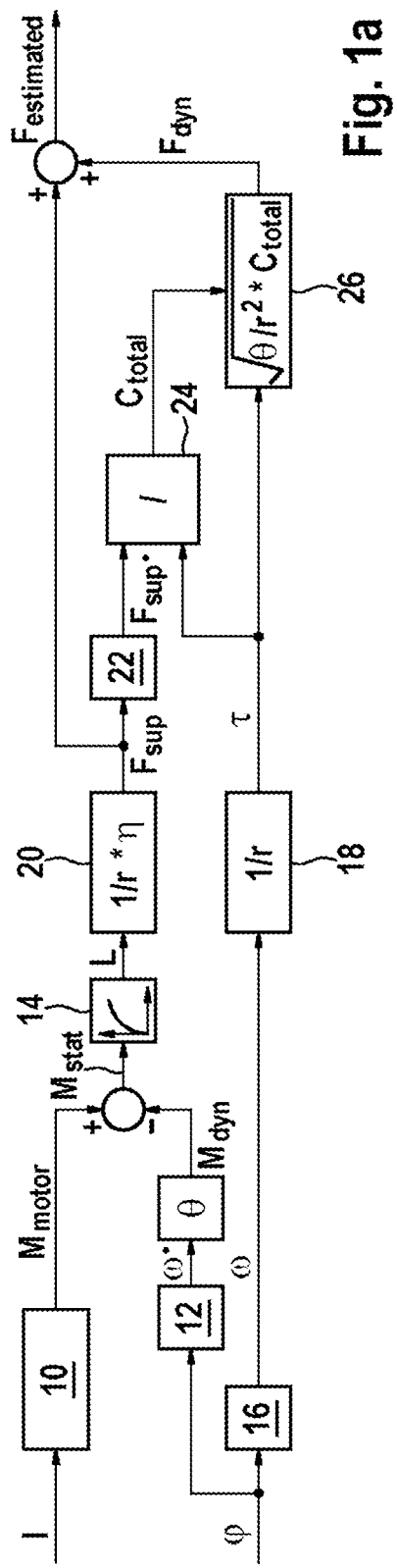
FIGS. 1a and 1b illustrate flow diagrams for explaining an embodiment of the method for operating an electromechanical brake booster of a brake system of a vehicle.
Figure 1B:
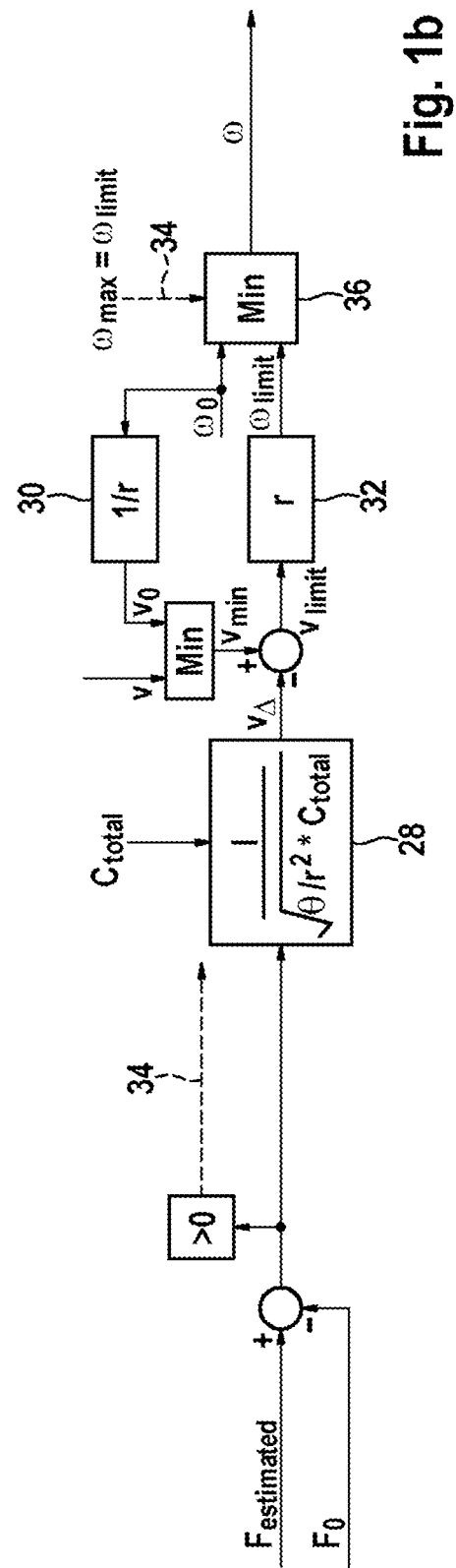

FIGS. 1a and 1b illustrate flow diagrams for explaining an embodiment of the method for operating an electromechanical brake booster of a brake system of a vehicle.

A capability of implementing the method described below is neither limited to a specific brake system type of the brake system that is fitted with the electromechanical brake booster nor to a specific vehicle type/motor vehicle type of the vehicle/motor vehicle that is fitted with the brake system. The term "electromechanical brake booster" is understood to mean a brake booster that is fitted with an (electric) motor. Moreover, the electromechanical brake booster is upstream of a master brake cylinder of the brake system in such a manner that at least one adjustable piston of the master brake cylinder may be adjusted/is adjusted into the master brake cylinder by means of operating the motor of the electromechanical brake booster.

In the case of the method described below, in order to operate the electromechanical brake booster, a desired value $\omega$ in relation to a desired rotational speed $\omega$ of the motor of the electromechanical brake booster is specified taking into account at least one (not illustrated) brake-specifying signal in relation to a braking request of a driver of the vehicle and/or an automatic speed-controlling system of the vehicle. The method is characterized by virtue of the fact that a highest desired value $\omega_{max}$ is specified in relation to a maximum desired rotational speed $\omega_{max}$ of the motor of the electromechanical brake booster, wherein the desired value $\omega$ in relation to the desired rotational speed $\omega$ of the motor of the electromechanical brake booster is specified at most equal to the highest desired value $\omega_{max}$ that is specified. (The highest desired value $\omega_{max}$ is therefore used as the "upper limit" or as the "highest threshold" when the desired value ω is specified in relation to the desired rotational speed ω of the motor of the electromechanical brake booster.) In the case of the method described here, the desired rotational speed ω of the motor of the electromechanical brake booster is specified in an exemplary manner as the desired value ω and the maximum desired rotational speed $\omega_{max}$ is specified as the highest desired value $\omega_{max}$. However, reference is made to the fact that other values that correspond to the desired rotational speed ω of the motor of the electromechanical brake booster and the maximum desired rotational speed $\omega_{max}$ may also be specified as the desired value w and the highest desired value $\omega_{max}$.

The highest desired value $\omega_{max}$ is specified taking into account at least one prevailing current strength I of a motor current of the motor of the electromechanical brake booster and a prevailing rotation angle φ of a rotor of the motor of the electromechanical brake booster. Values that may be easily estimated or measured may consequently be used in order to specify the highest desired value $\omega_{max}$ in relation to the maximum desired rotational speed $\omega_{max}$ of the motor of the electromechanical brake booster. (The prevailing rotation angle φ of the rotor of the motor may be determined/estimated by way of example by means of a rotor position signal.) The prevailing current strength I of the motor current and the prevailing rotation angle φ of the rotor of the motor of the electromechanical brake booster are moreover values/signals having particularly high dynamics. The method described here is therefore advantageously suitable for promptly reacting to a change in a hydraulic rigidity of the brake system that interacts with the electromechanical brake booster.

In the case of the embodiment of the method described here, in a partial step that is reproduced schematically by means of FIG. 1a an estimated value $F_{estimated}$ for a braking force of the electromechanical brake booster (upstream of the master brake cylinder of the brake system) into the master brake cylinder is estimated so as to specify the highest desired value $\omega_{max}$ in relation to the maximum desired rotational speed $\omega_{max}$ of the motor of the electromechanical brake booster. It is apparent that the estimated value $F_{estimated}$ for the braking force of the electromechanical brake booster into the master brake cylinder is estimated taking into account at least the prevailing current strength I of the motor current of the motor and the prevailing rotation angle φ of the rotor of the motor.

In particular, at least one load torque/counter torque L, which the brake system sets against the motor of the electromechanical brake booster, is estimated in order to estimate the estimated value $F_{estimated}$ for the braking force taking into account at least the prevailing current strength I of the motor current of the motor and the prevailing rotation angle φ of the rotor of the motor.

For this purpose, a motor torque $M_{motor}$ of the motor of the electromechanical brake booster is specified taking into account at least the prevailing current strength I of the motor current of the motor. Motor-specific data that are stored in a block 10 are taken into account in order to derive the motor torque $M_{motor}$ of the motor of the electromechanical brake booster from the prevailing current strength I of the motor current of the motor. The motor torque $M_{motor}$ of the motor of the electromechanical brake booster initiates a "dynamic of the motor" in response to a dynamic portion $M_{dyn}$ and initiates a "step of overcoming" the load torque/counter torque L that counteracts the motor of the electromechanical brake booster in response to a static portion $M_{stat}$. The dynamic portion $M_{dyn}$ may be calculated as a product of an angular acceleration ω• of the rotor of the motor of the electromechanical brake booster and an inertia θ of the motor of the electromechanical brake booster. The angular acceleration ω• of the rotor of the motor of the electromechanical brake booster may be easily specified taking into account at least the prevailing rotation angle φ of the rotor of the motor. By way of example, the angular acceleration ω• of the rotor of the motor is derived from a value that is twice the time derivative of the prevailing rotation angle φ of the rotor of the motor, said derivative being performed in a block 12. The static portion $M_{stat}$ of the motor torque $M_{motor}$ of the motor of the electromechanical brake booster therefore results from a difference between the motor torque $M_{motor}$ and the dynamic portion $M_{dyn}$ of the motor torque $M_{motor}$. The load torque L that counteracts the motor of the electromechanical brake booster may subsequently be estimated taking into account the static portion $M_{stat}$ of the motor torque $M_{motor}$ of the motor of the electromechanical brake booster. By way of example, the static portion $M_{stat}$ may be converted using an (accordingly stored) characteristic curve and/or a filter, which is/are stored in a block 14, into the load torque L that counteracts the motor of the electromechanical brake booster. (Afterward, the estimated value $F_{estimated}$ may be specified for the braking force and/or the highest desired value $\omega_{max}$ in relation to the maximum desired rotational speed $\omega_{max}$ of the motor of the electromechanical brake booster taking into account the estimated load torque L).

In the case of the embodiment described here, at least one load change $C_{total}$ of a load, which the brake system sets against the motor of the electromechanical brake booster, is estimated so as to specify the highest desired value $\omega_{max}$ in relation to the maximum desired rotational speed $\omega_{max}$ of the motor of the electromechanical brake booster or so as to estimate the estimated value $F_{estimated}$ for the braking force. The load change $C_{total}$ is likewise estimated taking into account at least the prevailing current strength I of the motor current of the motor of the electromechanical brake booster and the prevailing rotation angle φ of the rotor of the motor of the electromechanical brake booster. Afterward, the estimated value $F_{estimated}$ may be specified for the braking force or the highest desired value $\omega_{max}$ in relation to the maximum desired rotational speed $\omega_{max}$ taking into account the estimated load change $C_{total}$.

An adjustment travel/a translation $_T$ of a piston of the electromechanical brake booster may be specified taking into account at least the prevailing rotation angle φ of the rotor of the motor. For example, an angular velocity ω of the rotor of the motor is derived by means of a time derivative of the prevailing rotation angle φ of the rotor of the motor of the electromechanical brake booster, said derivative being performed in a block 16. A transmission value r of a transmission of the electromechanical brake booster is stored in a block 18 and the angular velocity ω of the rotor of the motor is converted by means of said transmission value into the adjustment travel/the translation $_T$ of the piston of the electromechanical brake booster, said piston being arranged downstream of the transmission. The piston that is arranged downstream of the transmission may be for example a valve body or a boost body of the electromechanical brake booster.

A motor force/supporting force $F_{sup}$ that is exerted by means of the motor of the electromechanical brake booster is specified taking into account the load torque L. By way of example, the transmission value r of the transmission of the electromechanical brake booster and an efficiency η of the electromechanical brake booster are stored in a block 20. A motor force/supporting force $F_{sup}$ that is exerted by means of the motor of the electromechanical brake booster may be derived from the load torque L by means of these values. Moreover, a time derivative/a gradient Fsup• of the motor force/supporting force Fsup that is exerted by means of the motor of the electromechanical brake booster is determined in a block 22.

In a further block 24, a quotient $C_{total}$ is calculated from the time derivative/the gradient Fsup. divided by the adjustment travel/the translation $_T$ of the piston of the electromechanical brake booster, said quotient indicating the load change $C_{total}$ The load change $C_{total}$ may also be described as a rigidity (stiffness).

The load change $C_{total}$ is output to a block 26 in which the inertia θ of the motor of the electromechanical brake booster and the transmission value r of the transmission of the electromechanical brake booster are stored. A dynamic force $F_{dyn}$ that is exerted by means of the electromechanical brake booster may therefore be calculated from the load change $C_{total}$. The dynamic force $F_{dyn}$ that is to be exerted by means of the electromechanical brake booster may also be described as a "force from a kinetic energy" of the rotor of the motor of the electromechanical brake booster.

The estimated value $F_{estimated}$ for a braking force (or "pressure increasing force") of the electromechanical brake booster, with which the electromechanical brake booster brakes into the master brake cylinder and initiates/increases the master brake cylinder pressure that is present therein, may be calculated from a sum of the motor force/supporting force $F_{sup}$ that is exerted by means of the electromechanical brake booster and the dynamic force $F_{dyn}$ that is exerted by means of the electromechanical brake booster. A (not illustrated) frictional correction may also be optionally performed for the estimated value $F_{estimated}$ for the braking force.

The partial steps that are described in the above paragraphs offer a particularly advantageous possibility that may be rapidly performed for reliably estimating the estimated value $F_{estimated}$ for the braking force. However, a capability of implementing the method is not limited to these partial steps. The highest desired value $\omega_{max}$ is subsequently specified taking into account the estimated value $F_{estimated}$ for the braking force. This is illustrated by means of the method step that is represented schematically in FIG. 1b:

Initially, a difference ΔF is determined between the estimated value $F_{estimated}$ for the braking force of the electromechanical brake booster into the master brake cylinder, said estimated value being specified by means of the above-described method step, and a predetermined comparison force $F_0$. (It is possible by means of the comparison force $F_0$ to investigate whether the prevailing pending braking force is too high by precisely the estimated value $F_{estimated}$) The difference ΔF is subsequently output in a block 28 in which the inertia θ of the motor of the electromechanical brake booster, the transmission value r of the transmission of the electromechanical brake booster and the load change $C_{total}$ are present, is converted into a speed value $v_\Delta$.

A starting value $\omega_0$ in relation to a starting rotational speed $\omega_0$ of the motor of the electromechanical brake booster is specified taking into account at least the (not illustrated) brake-specifying signal (in relation to the braking request of the driver of the vehicle and/or the automatic speed-controlling system of the vehicle). The starting value $\omega_0$ in relation to the starting rotational speed $\omega_0$ of the motor is converted into a starting speed $v_0$ in a block 30 in which the transmission value r of the transmission of the electromechanical brake booster is stored. Afterward, a minimum $v_{min}$ is determined from the starting speed $v_0$ and a prevailing speed v. A limit speed $v_{limit}$ is determined as the difference between the minimum $v_{min}$ and the speed value $v_\Delta$. The limit speed $v_{limit}$ is converted into a limit value $\omega_{limit}$ by means of the transmission value r of the transmission of the electromechanical brake booster, said transmission value being stored in a block 32. The limit value $\omega_{limit}$ indicates a rotational speed with which the motor of the electromechanical brake booster may also be operated without any problems with regard to the prevailing hydraulic rigidity of the brake system.

If the difference ΔF between the estimated value $F_{estimated}$ for the braking force and the comparison force $F_0$ is greater than 0, it is dictated to a block 36 by means of a signal 34 to assume the limit value $\omega_{limit}$ that is output to said block as the highest desired value $\omega_{max}$. Moreover, the block 36 is activated by means of the signal 34 so as to limit the desired value ω by means of the highest desired value $\omega_{max}$. In this case, the block 36 outputs a minimum from the starting value $\omega_0$ and the highest desired value $\omega_{max}$ as the desired value ω. If the difference ΔF between the estimated value $F_{estimated}$ for the braking force and the comparison force $F_0$ is less than 0, the signal 34 is thus not output to the block 36. The desired value w is therefore specified as identical to the starting value $\omega_0$. (The highest desired value $\omega_{max}$ therefore corresponds to a rotational speed that may be executed maximally by means of the motor of the electromechanical brake booster.) In both cases, the desired value ω in relation to the desired rotational speed ω of the motor of the electromechanical brake booster (for actuating the motor of the electromechanical brake booster) is consequently specified at most equal to the highest desired value $\omega_{max}$ that is specified.

After the desired value ω is specified in relation to the desired rotational speed ω of the motor of the electromechanical brake booster, the motor of the electromechanical brake booster is actuated taking into account the desired value ω that is specified. It is preferred that this is performed in such a manner that during the resulting operation of the electromechanical brake booster an actual rotational speed of the motor of the electromechanical brake booster does not exceed the desired value ω that is previously specified (or the corresponding desired rotational speed ω).

The method described here initiates a limitation of the operation of the electromechanical brake booster in such a manner that even in the event of load changes owing to an altered hydraulic rigidity of the brake system, fears of an excess pressure or of pressure spikes therein are unfounded. In addition to preventing a brake system overload however it is possible by means of the method described here to also rule out braking procedures that are insufficiently intense. Furthermore, in the case of the method described here it is possible to react promptly to wheel inlet valves of the brake system being (actually) closed, wherein however it is simultaneously ensured that the corresponding reduction of the operation of the motor of the electromechanical brake booster only occurs after the wheel inlet valves have actually closed. The method described here consequently not only initiates a limitation of the operation of the motor of the electromechanical brake booster so as to preserve the brake system that cooperates with said brake booster but said method also ensures by means of the electromechanical brake booster furthermore that a significant brake boosting procedure may be initiated in such situations in which this is not crucial.

In conclusion, further reference is made to the fact that the partial steps that are illustrated in FIGS. 1a and 1b may be performed more rapidly than a data transfer/signal transfer via a data bus of a measured value that is measured by means of at least one pressure sensor. An implementation of the method described here consequently renders it possible to "predict" a change in the hydraulic rigidity of the brake system (with respect to measuring the change in the hydraulic rigidity of the brake system).

Figure 2:
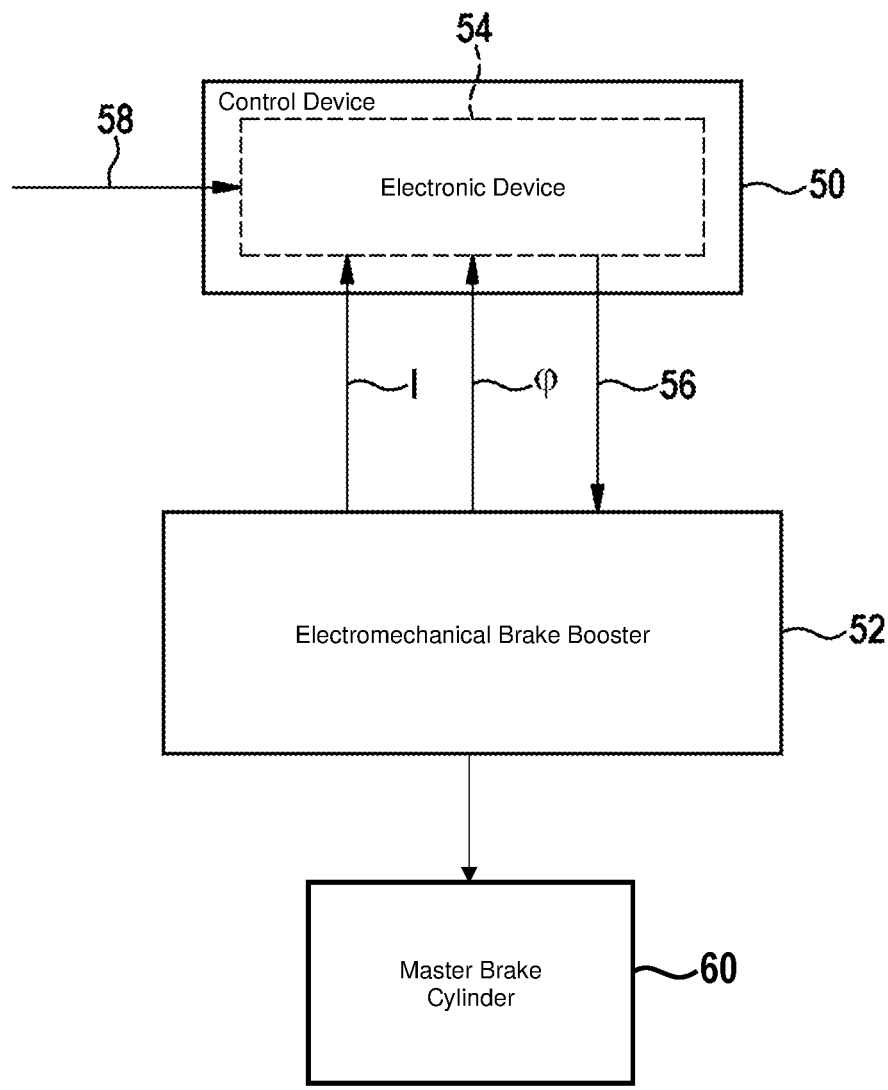
FIG. 2 illustrates schematically an embodiment of the control device for at least one electromechanical brake booster of a brake system of a vehicle.

FIG. 2 illustrates schematically an embodiment of the control device for at least one electromechanical brake booster of a brake system of a vehicle.

A capability of using the control device 50 that is described below is neither limited to a specific brake system type of the brake system nor to a specific vehicle type/motor vehicle type of the vehicle/motor vehicle that is fitted with the brake system. Reference is made to the above description in relation to the electromechanical brake booster 52 that cooperates with the control device 50. The electromechanical brake booster 52 is upstream of the master brake cylinder 60 of the brake system.

The control device 50 comprises an electronic device 54 that is designed for the purpose of specifying at least one desired value ω in relation to a desired rotational speed ω of a motor of the electromechanical brake booster taking into account at least one brake-specifying signal 56 that is output to the electronic device 54 in relation to a braking request of a driver of the vehicle and/or a (not illustrated) automatic speed-controlling system of the vehicle. Moreover, the electronic device 54 is designed for the purpose of outputting at least one control signal 58 to the motor of the electromechanical brake booster 52 taking into account the desired value ω that is specified, or for the purpose of operating the electromechanical brake booster 52. It is preferred that the at least one control signal 58 is output to the motor of the electromechanical brake booster 52 in such a manner that during the resulting operation of the electromechanical brake booster 52 an actual rotational speed of the motor of the electromechanical brake booster 52 does not exceed the desired value ω that is previously specified (or the corresponding desired rotational speed ω).

Moreover, the electronic device 54 is designed for the purpose of specifying a highest desired value $\omega_{max}$ in relation to a maximum desired rotational speed $\omega_{max}$ of the motor of the electromechanical brake booster 52 taking into account at least one prevailing current strength I of a motor current of the motor of the electromechanical brake booster 52 and a prevailing rotation angle φ of a rotor of the motor of the electromechanical brake booster 52 and for the purpose of specifying the desired value ω in relation to the desired rotational speed ω of the motor of the electromechanical brake booster 52 at most equal to the highest desired value $\omega_{max}$ that is specified.

The use of the control device 50 consequently also brings about the advantages already described above. The electronic device 54 may in addition be embodied so as to implement at least one of the method steps that are described above.

The invention claimed is:

1. A control device for at least one electromechanical brake booster of a brake system of a vehicle, the control device comprising:
an electronic device configured to:
specify a target rotational speed of a motor of the at least one electromechanical brake booster based on at least one brake-specifying signal that is output to the electronic device in relation to at least one of (i) a braking request of a driver of the vehicle and (ii) an automatic speed-controlling system of the vehicle;
output at least one control signal to the motor of the at least one electromechanical brake booster based on the target rotational speed; and
specify a maximum target rotational speed of the motor of the at least one electromechanical brake booster based on at least one prevailing current strength of a motor current of the motor of the at least one electromechanical brake booster and a prevailing rotation angle of a rotor of the motor of the at least one electromechanical brake booster,
wherein the target rotational speed of the motor of the at least one electromechanical brake booster is specified less than or equal to the maximum target rotational speed.

2. The control device as claimed in claim 1, the electronic device being further configured to:
estimate a value for a braking force of the at least one electromechanical brake booster that is upstream of a master brake cylinder of the brake system based on the at least one prevailing current strength of the motor current of the motor and the prevailing rotation angle of the rotor of the motor,
wherein the maximum target rotational speed is specified based on the estimated value for the braking force.

3. The control device as claimed in claim 2, the electronic device being further configured to:
estimate a load torque, which the brake system sets against the motor of the at least one electromechanical brake booster, based on the at least one prevailing current strength of the motor current of the motor and the prevailing rotation angle of the rotor of the motor,
wherein at least one of (i) the maximum target rotational speed and (ii) the estimated value for the braking force is specified based on the estimated load torque.

4. The control device as claimed in claim 3, the electronic device being further configured to:
specify a motor torque of the motor of the at least one electromechanical brake booster based on the at least one prevailing current strength of the motor current of the motor;
specify an angular acceleration of the rotor of the motor of the at least one electromechanical brake booster based on the prevailing rotation angle of the rotor of the motor;
specify a product of the angular acceleration of the rotor of the motor of the at least one electromechanical brake booster and an inertia of the motor; and
specify the load torque based on a difference between the motor torque of the motor and the product of the angular acceleration and the inertia.

5. The control device as claimed in claim 3, the electronic device being further configured to:
estimate a load change of a load, which the brake system sets against the motor of the at least one electromechanical brake booster, based on the at least one prevailing current strength of the motor current of the motor and the prevailing rotation angle of the rotor of the motor,
wherein at least one of (i) the maximum target rotational speed and (ii) the estimated value for the braking force is specified based on the estimated load change.

6. The control device as claimed in claim 5, the electronic device being further configured to:
specify an adjustment travel of a piston of the at least one electromechanical brake booster based on the prevailing rotation angle of the rotor of the motor;

specify a motor force that is exerted by the motor of the at least one electromechanical brake booster based on the load torque;

specify one of (i) a time derivative and (ii) a gradient of the motor force that is exerted by the motor of the at least one electromechanical brake booster; and specify the load change as a quotient of the one of (ii) the time derivative and (ii) the gradient of the motor force divided by the adjustment travel of the piston of the at least one electromechanical brake booster.

7. The control device as claimed in claim 1, wherein the control device is a component of the at least one electromechanical brake booster.

8. A brake system for a vehicle comprising:
an electromechanical brake booster; and
a control device configured to operate the at least one electromechanical brake booster the control device having an electronic device configured to:
specify a target rotational speed of a motor of the at least one electromechanical brake booster based on at least one brake-specifying signal that is output to the electronic device in relation to at least one of (i) a braking request of a driver of the vehicle and (ii) an automatic speed-controlling system of the vehicle;
output at least one control signal to the motor of the at least one electromechanical brake booster based on the target rotational speed at; and
specify a maximum target rotational speed of the motor of the at least one electromechanical brake booster based on at least one prevailing current strength of a motor current of the motor of the at least one electromechanical brake booster and a prevailing rotation angle of a rotor of the motor of the at least one electromechanical brake booster,
wherein the target rotational speed of the motor of the at least one electromechanical brake booster is specified less than or equal to the maximum target rotational speed.

9. The brake system as claimed in claim 8 further comprising:
a master brake cylinder, the electromechanical brake booster being upstream of the master brake cylinder.

10. A method for operating an electromechanical brake booster of a brake system of a vehicle, the method comprising:
specifying a target rotational speed of a motor of the at least one electromechanical brake booster based on at least one brake-specifying signal in relation to at least one of (i) a braking request of a driver of the vehicle and (ii) an automatic speed-controlling system of the vehicle;
actuating the motor of the electromechanical brake booster based on the target rotational speed; and
specifying a maximum target rotational speed of the motor of the electromechanical brake booster based on at least one prevailing current strength of a motor current of the motor of the at least one electromechanical brake booster and a prevailing rotation angle of a rotor of the motor of the electromechanical brake booster,
wherein the target rotational speed of the motor of the electromechanical brake booster is specified less than or equal to the maximum target rotational speed.

11. The method as claimed in claim 10 further comprising:
estimating a value for a braking force of the at least one electromechanical brake booster that is upstream of a master brake cylinder of the brake system based on the at least one prevailing current strength of the motor current of the motor and the prevailing rotation angle of the rotor of the motor,
wherein the maximum target rotational speed is specified based on the estimated value for the braking force.

12. The method as claimed in claim 11 further comprising:
estimating at least one load torque, which the brake system sets against the motor of the at least one electromechanical brake booster, based on the at least one prevailing current strength of the motor current of the motor and the prevailing rotation angle of the rotor of the motor,
wherein at least one of (i) the maximum target rotational speed and (ii) the estimated value for the braking force is specified based on the load torque.

13. The method as claimed in claim 12, the estimating the at least one load torque further comprising:
specifying a motor torque of the motor of the electromechanical brake booster based on the at least one prevailing current strength of the motor current of the motor;
specifying an angular acceleration of the rotor of the motor of the electromechanical brake booster based on the prevailing rotation angle of the rotor of the motor;
specifying a product of the angular acceleration of the rotor of the motor of the electromechanical brake booster and an inertia of the motor; and
specifying the load torque based on a difference between the motor torque of the motor and the product of the angular acceleration and the inertia.

14. The method as claimed in claim 12 further comprising:
estimating at least one load change of a load, which the brake system sets against the motor of the electromechanical brake booster, based on the at least one prevailing current strength of the motor current of the motor and the prevailing rotation angle of the rotor of the motor,
wherein at least one of (i) the maximum target rotational speed and (ii) the estimated value for the braking force is specified based on the at least one load change.

15. The method as claimed in claim 14, the estimating the at least one load change further comprising:
specifying an adjustment travel of a piston of the electromechanical brake booster based on the prevailing rotation angle of the rotor of the motor;
specifying a motor force that is exerted by the motor of the at least one electromechanical brake booster based on the at least one load torque;
specifying one of (i) a time derivative and (ii) a gradient of the motor force that is exerted by the motor of the at least one electromechanical brake booster; and
specifying the at least one load change as a quotient of the one of (i) the time derivative and (ii) the gradient of the motor force divided by the adjustment travel of the piston of the at least one electromechanical brake booster.

* * * * *

UNITED STATES PATENT AND TRADEMARK OFFICE
CERTIFICATE OF CORRECTION

PATENT NO. : 11,572,048 B2
APPLICATION NO. : 16/470271
DATED : February 7, 2023
INVENTOR(S) : Vollert et al.

It is certified that error appears in the above-identified patent and that said Letters Patent is hereby corrected as shown below:

In the Claims

In Claim 8, at Column 11, Line 28: "target rotational speed at; and" should read --target rotational speed; and--.

Signed and Sealed this
Thirtieth Day of May, 2023

Katherine Kelly Vidal
*Director of the United States Patent and Trademark Office*